Figure 1:
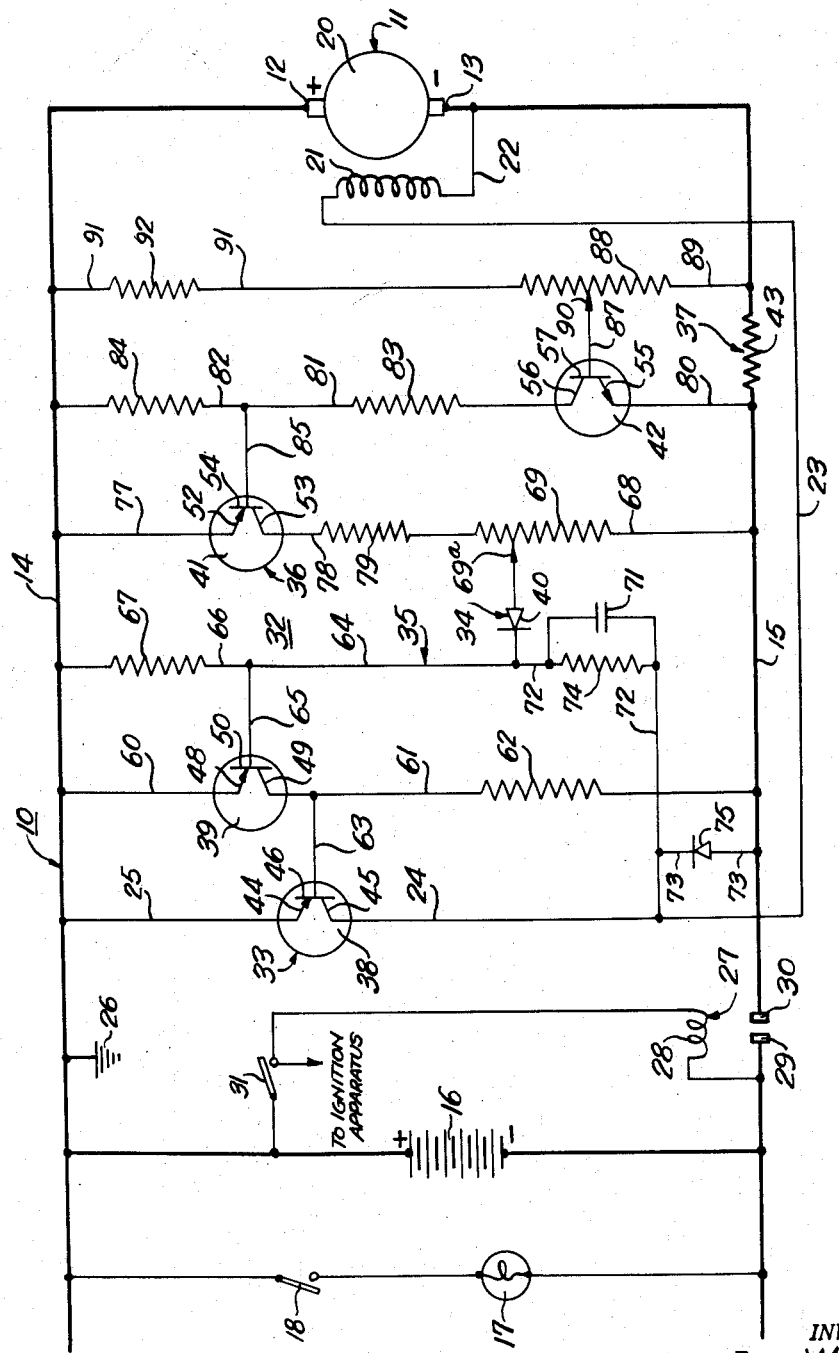

INVENTOR.
JOHN W. KORDA

INVENTOR.
JOHN W. KORDA
ATTORNEYS

United States Patent Office 3,072,839
Patented Jan. 8, 1963

3,072,839
ELECTRIC GENERATING SYSTEM REGULATION
John W. Korda, East Cleveland, Ohio, assignor to The Leece-Neville Company, Cleveland, Ohio, a corporation of Ohio
Filed Apr. 14, 1960, Ser. No. 22,208
15 Claims. (Cl. 322—25)

This invention relates to electrical systems comprising a generator means and a load connected therewith and, more particularly, to systems of this kind which embody regulating means for automatically controlling the field excitation of the generator means in accordance with different operating conditions and to the extent necessary to maintain generator output substantially constant.

An object of the invention is to provide novel regulator means in such an electrical system by which a current limiting function is achieved in an advantageous manner not afforded in generating systems and regulating apparatus previously available.

The present day trend in various electrical systems of this kind, such as in vehicle electrical systems, is toward the use therein of a so-called fully static type of regulator means employing transistors and the like. In some of these static-regulator generating systems no current limiting control is provided at all, but the generator means thereof is permitted to reach maximum output for the higher range of vehicle speeds.

The omission of current limiting control is a serious disadvantage in many electrical generating systems, particularly in alternator-rectifier types of systems, because if the alternator is designed to provide adequate output for low operating speeds, its maximum output for higher speeds will be such as to require a power rectifier large enough to handle the higher alternator output without damage due to overheating. The use of a power rectifier of a large size represents added expense, and if a smaller and less expensive power rectifier is used the problem of adequate cooling thereof is encountered.

In electrical generating systems embodying the static type of regulating means the transistors employed are usually germanium PNP type transistors because of manufacturing and cost advantages for this type in comparison with silicon transistors and NPN type transistors. In keeping with this use in previous electrical generating systems of PNP type transistors in the regulator means thereof, those systems employing a common ground have heretofore been limited to negative-ground systems.

The present invention takes cognizance of these problems and situations and further provides an electrical generating system which not only achieves the advantages of automatic current regulation or limiting with respect to the generator output and the use of germanium PNP type transistors to a major extent in the static regulator means thereof, but also provides such a system in the form of a positive-ground system which is usually preferred for heavy duty service and for the electrical systems of commercial type vehicles.

Additionally this invention provides novel regulating means for electrical generating systems of the character referred to above, comprising transistor switching means controlling the field excitation of the generator means in response to a signal supplied by a current sensing means, and wherein the current sensing means comprises a series resistor located in the negative load conductor means of the system and an NPN transistor associated with such resistor.

Figure 2:
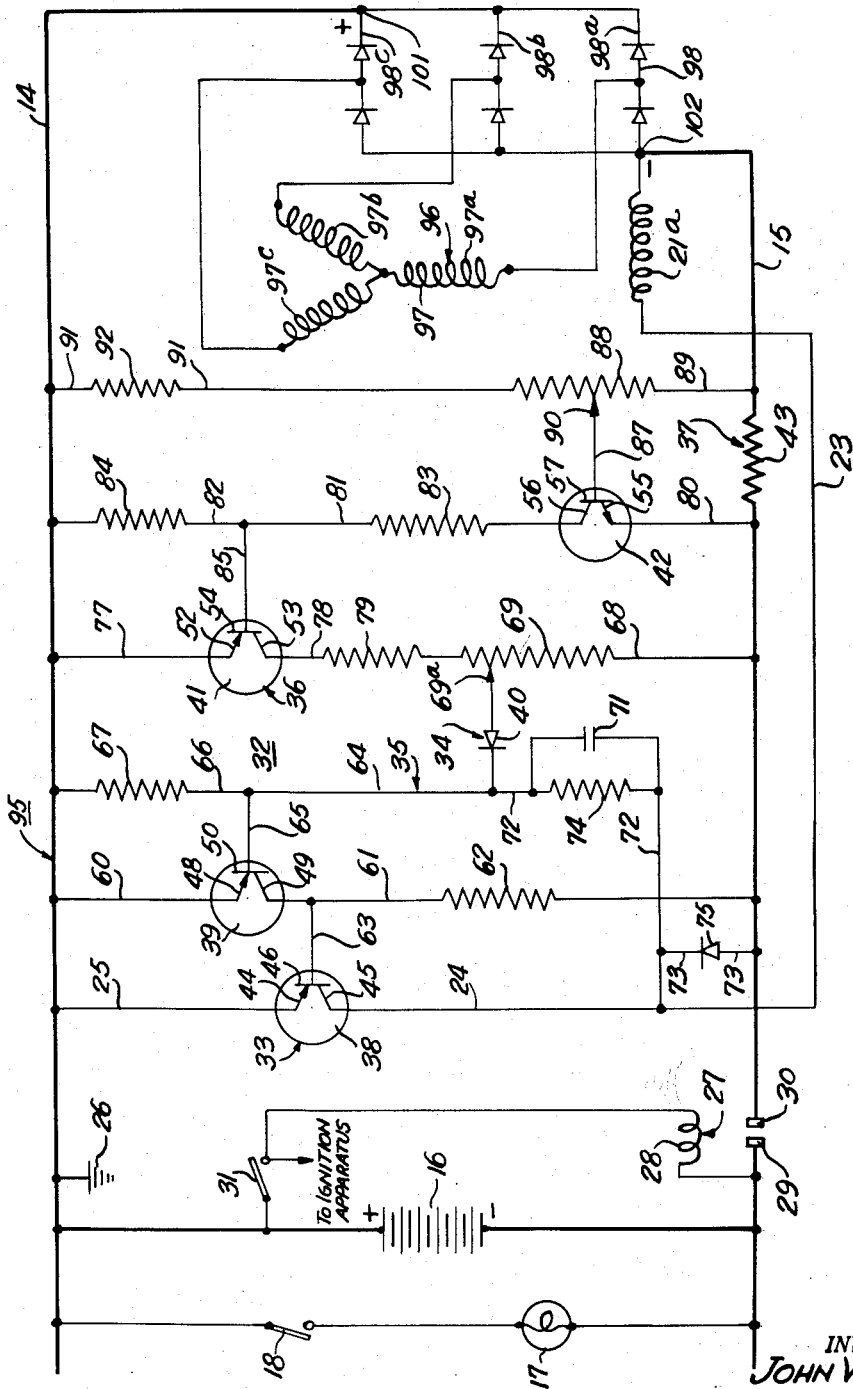

Other objects and advantages of this invention will be apparent in the following detailed description and in the accompanying drawings forming a part of this specification and in which FIG. 1 is a wiring diagram showing an electric generating system embodying the present invention; and
FIG. 2 is a wiring diagram showing another embodiment of the invention.

As representing one practical embodiment of this invention, the wiring diagram of FIG. 1 shows an electric generating system 10 suitable for vehicle use and other uses and comprising in general, a generating means or unit 11 having positive and negative output terminals 12 and 13, positive and negative load conductor means 14 and 15 connected with the positive and negative load terminals 12 and 13 respectively, and a storage battery 16 connected with the load conductors for charging by the generator means 11. In addition to or instead of the battery 16 the external load may comprise various other devices connected with the load conductors 14 and 15, such as an incandescent lamp 17 controlled by a suitable switch 18.

The generator means 11 includes a field excitation winding 21, and the system 10 includes a field circuit comprising conductors 22, 23, 24 and 25 by which the field winding is connected across the load terminals 12 and 13. The generating means 11 is shown in FIG. 1 as comprising a direct current generator 20 with the field winding 21 thereof being a shunt-connected field winding.

The load conductor means 14 of the system 10 is shown as having a ground connection 26 so that this conductor means provides a common ground for the positive side of the generating system. A load relay 27, of a conventional form comprising a magnet coil 28 and switch contacts 29 and 30, is included in the generating system 10 when the external load comprises the battery 16 and has the switch contacts thereof located in the load conductor 15. The magnet coil 28 of the load relay 27 is connected across the terminals of the battery 16 so as to be energizable therefrom by the closing of a suitable switch 31 which, in this case, is a conventional ignition switch controlling the ignition apparatus of the vehicle on which the generating system 10 is being used.

The generating system 10 also embodies regulator means 32 of the so-called static type comprising semiconductor switching means 33 for controlling the energization of the field winding 21, a voltage sensing means 34 connected with the switching means 33 by control circuit means 35, and a current limiting means 36 which is also connected with the switching means 33 through the control circuit means 35 and which includes a current sensing means 37. As will be further explained hereinafter, the voltage sensing means 34 and the current sensing means 37 supply voltage control and current control signals to the switching means 33 for causing the latter to so vary the energization of the field winding 21 as to regulate the output of the generator means 11 and automatically maintain such output substantially constant regardless of variations in the operating speed of the generator means.

The switching means 33 is here shown as being a transistor switching means comprising a first pair of transistors 38 and 39. The voltage sensing means 34 comprises a Zener diode 40 connected across the load conductors 14 and 15 in a relation to be explained hereinafter. The current sensing means comprises a second pair of transistors 41 and 42 and a series resistor 43 associated with the latter transistor and located in one of the load conductors of the system, in this case in the negative load conductor 15.

The transistors 38, 39 and 41 are preferably germanium PNP type transistors and, for a purpose to be explained hereinafter, the transistor 42 is an NPN transistor which is preferably also a germanium transistor. The transistor 38 has main electrodes or junction terminals comprising emitter and collector electrodes 44 and 45 and a base or control electrode 46. The main electrodes 44 and 45 are located in the above-mentioned energizing circuit for the field winding 21 and function as a switching means which is operable to one or the other of two stable switch conditions for providing a variable impedance in such field circuit.

The transistor 39 is also a switching transistor which controls the transistor 38 and has main electrodes or terminals comprising emitter and collector electrodes 48 and 49 and a base or control electrode 50. The transistor 41 has main electrodes or terminals comprising emitter and collector electrodes 52 and 53 and a base or control electrode 54. The transistor 42 likewise has main electrodes or terminals comprising emitter and collector electrodes 55 and 56 and a base or control electrode 57.

The transistor 39 has its main electrodes connected across the load conductors 14 and 15 through conductors 60 and 61, and through a resistor 62 of suitable value located in the latter conductor. The base 46 of the transistor 38 is connected directly with the collector electrode 49 of the transistor 39 by a conductor 63. The base 50 of the transistor 39 is connected directly with a conductor 64 of the control circuit means 35 by a conductor 65. One end of the conductor 64 is connected with the load conductor 14 by a conductor portion 66 containing a resistor 67 of a suitable high value, so that this resistor is in parallel with the conductor 60.

The Zener diode 40 of the voltage sensing means 34 is connected across the load conductors 14 and 15 by a portion of the control circuit means 35 comprising the conductors 60, 65 and 64, and through a conductor 68 connected with the load conductor 15 and a variable resistor or potentiometer 69 located in the latter conductor and having a slider contact 69ª. The slider contact 69ª provides an adjustable connection by which the voltage setting for the diode 40 can be varied.

The other end of the conductor 64, that is the portion thereof to which the diode 40 is connected, is connected with the load conductor 15 through conductors 72 and 73 of which the conductor 72 contains a resistor 74 of a relatively high resistance value and the conductor 73 contains a diode or rectifier cell 75 which is thus in a parallel circuit relation with the field winding 21 to protect the transistor 45 from damage by voltages induced in the field winding. A suitable capacitor 71 is connected with the conductor 72 so as to be in parallel with the resistor 74.

When the transistor 38 is operating in a saturated condition due to a base current of appropriate value flowing through the emitter-to-base circuit provided by the conductors 25, 63 and 61 and the resistor 62, the voltage drop between the emitter 44 and the collector 45 will be very low and will provide only a low impedance in the energizing circuit of the field winding 21 and, at this time, the transistor 38 will be functioning in what can be conveniently referred to as an "on" switch condition for the main electrodes 44 and 45 thereof.

Assuming that the Zener diode 40 is, at this time, in a nonconducting state there will be no substantial amount of base current flowing through the transistor 39. This transistor will consequently then be in a nonconducting condition in which the main electrodes 48 and 49 thereof can be referred to as being in an "off" switch relation with a high voltage drop therebetween as an impedance of high value in the circuit portion comprising the conductors 60 and 61.

As the terminal voltage of the generating means 11 increases, the voltage applied to the Zener diode 40 will increase to the breakdown value whereupon this diode will become conductive and base current will then flow between the emitter and base 48 and 50 of the transistor 39 and through the circuit provided by the conductors 60, 65, 64 and 68.

The flow of base current in the transistor 39 will cause this transistor to be switched to its conductive or "on" condition in which there is only a very low voltage drop across the main electrodes 48 and 49. Because of the resulting low impedance through the main electrodes of the transistor 39 and through the conductor 60, the base current for the transistor 38 is reduced to substantially a zero value causing the latter transistor to be switched to its "off" condition. In the "off" condition of the transistor 38 its main electrodes 44 and 45 provide a high impedance in the field circuit thereby decreasing the energization of the field winding 21.

When the terminal voltage of the generating means 11 decreases due to such decreased field excitation, the voltage impressed on the Zener diode 40 decreases to the point where this diode ceases to be conductive and thereupon interrupts the base current flow through the transistor 39. This results in the transistor 39 being switched to its "off" condition thereby causing the flow of base current through the transistor 38 to be restored for switching the latter transistor back to its "on" condition for again increasing the energization of the field winding 21.

The transistor 41 of the current limiting means 36 has its main electrodes 52 and 53 connected across the load conductors 14 and 15 by a circuit extending through the above-mentioned conductor 68 and variable resistor 69, and through conductors 77 and 78 and a suitable resistor 79 located in the latter conductor. The resistor 79 supplements the variable resistor 69 so that the latter can be of an inexpensive size.

The transistor 42 forms a part of the current sensing means 37, which is further described hereinafter, and has its main electrodes 55 and 56 connected across the load conductors 14 and 15 by a circuit extending through conductors 80, 81 and 82 and through resistors 83 and 84 located in the latter two conductors, The base 54 of the transistor 41 is connected with the conductor 81 by a conductor 85. It will thus be seen that the circuit for the base current of the conductor 41 extends through conductors 77, 85, 81 and 80 as well as through the main electrodes 55 and 56 of the transistor 42. The resistor 83 is of a relatively high resistance valve so as to keep the base current of the transistor 41 at a relatively low value.

The transistor 41 normally operates in a condition of deep saturation and the transistor 42 likewise normally operates in a condition of deep saturation. The resistor 79 is of a resistance value to prevent an excessive or damaging flow of current through the main electrodes of the transistor 41. The resistors 83 and 84 are effective to prevent any excessive or damaging flow of current through the main electrodes of the transistor 42.

The transistor 42 has its emitter and base electrodes 55 and 57 connected across the terminals of the series resistor 43 of the load conductor 15. Thus the emitter electrode 55 is connected with one end of the series resistor 43 through the conductor 80, and the base 57 is connected with the other end of the series resistor through a conductor 87, a portion of a resistor 88, and through a conductor 89 connecting one end of the latter resistor with the load conductor 15. The connection between the conductor 87 and the resistor 88 is preferably by an adjustable or slider connection 90 by which the resistance provided by the resistor 88 in the base circuit of the transistor 42 can be suitably varied to achieve the operating characteristics desired for this transistor. The other end of the resistor 88 is connected with the load conductor 14 by a conductor 91 and through a suitable resistor 92 located in the latter conductor. The resistor 92 is usually of a high resistance value for keeping the base current of the transistor 42 at a suitable low value. The circuit for the base current of the transistor 42 is through the conductor 91, the resistor 92, a portion of the resistor 88 and then through the conductors 87 and 80.

The transistor 42 and the series resistor 43 in the connected relation described above for the load current sensing means 37 are responsive to load curernt variations in the load conductor 15 and, in conjunction with the transistor 41, supply a current control signal to the transistor switching means 33 through the control circuit means 35. The base current circuit traced above for the transistor 42 continuously supplies base current thereto so that this transistor normally operates in the condition of deep saturation mentioned above. When the transistor 42 is operating in such a normally saturated condition, the base current circuit for the transistor 41 extends through the conductors 77, 85, 81 and 80 and through the main electrodes 55 and 56 of the transistor 42, and consequently, the transistor 41 will operate in a saturated condition so long as the transistor 42 operates in a saturated condition.

The setting for the slider connection 90 in the base circuit of the transistor 42 is so selected that the operation of this transistor in a condition of deep saturation is with a lower emitter to collector voltage between the main elecrodes 55 and 56 and which voltage will remain practically unchanged until the base current through this transistor falls to a level low enough so that this transistor is operating just barely into t e saturation state. When the transistor 42 is operating under the condition where such a change in the base current has taken place, it will be seen that only a further small reduction in the base current will be needed to drive this transistor out of saturation whereupon the voltage drop across the main electrodes 55 and 56 will suddenly become comparatively large and this will, in turn, interrupt the base current for the transistor 41 to drive the latter out of saturation.

The current limiting means 37 has no effect on the operation of the regulator means 32 as long as the load current in the conductor 15 does not exceed the limit for which the limiting means has been adjusted by the setting selected for the slider 90. As long as the load current remains low in value, the voltage regulator means 33 will operate to control the output voltage in acordance with the voltage signals supplied, in the manner already explained above. However, when the load current increases beyond the limit set, the transistors 42 and 41 are driven out of saturation in succession and the resulting high voltage drop across the main electrodes 52 and 53 of the latter transistor causes the breakdown voltage of the Zener diode 40 to be exceeded.

The Zener diode 40 thereupon become conductive to cause the transistor 39 to be switched on and the transistor 38 to be switched off. The terminal voltage of the generator means 11 then falls to a value where the battery 16 will supply the portion of the load current which is in excess of the current limiting setting. If the overload condition persists, the excess load current portion being supplied by the battery 16 will steadily lower the battery voltage. The terminal voltage of the generator means 11 will follow the battery voltage downward as the regulator means 32 balances the generator output voltage against the battery voltage, to thereby permit a generator output current equal to the current limiting setting to be reached.

With respect to the current sensing means 37 of which transistor 42 is an NPN transistor and the associated series resistor 43 is located in the negative load conductor 15, as mentioned above, the base 57 of the transistor 42 is normally at a positive potential relative to the emitter 55 for the flow of base current which causes this transistor to normally operate in the condition of deep saturation previously referred to herein. When the load current in the series resistor 43 rises above the value corresponding with the setting at which the transistor 42 is intended to operate, the voltage drop across the resistor increases correspondingly and causes the potential difference between the emitter 55 and the base 57 to decrease to the extent that the resulting change in the base-to-emitter potential causes the transistor 42 to be driven out of saturation. When this occurs, the transistor 41 is likewise driven out of saturation and the breakdown voltage of the Zener diode 40 is exceeded with the result that this diode becomes conductive and a current limiting signal is thereupon applied to t e control electrode 50 of the transistor switching means 33. The output of the generating means 11 is thereupon reduced in the same manner as was previously explained above in connection with the application of a voltage-control signal to this switching means.

When the load current flowing through the series resistor 43 decreases to a value below the limiting value, the positive bias of the base-to-emitter potential is re-established to thereby restore the transistors 42 and 41 to their normal condition of operation in deep saturation. This is effective to decrease the voltage applied to the Zener diode 40 and to interrupt the conductivity thereof, with the result that the transistor switching means 33 increases the energization of the field winding 21 to correspondingly increase the output of the generating means 11.

FIG. 2 of the drawings shows a generating system 95 which comprises the same components as the generating system 10 and functions in the same manner, except that the generating means or unit 96 of the modified system is an alternator-rectifier generating unit comprising an alternator 97 and a power rectifier 98. The alternator 97 is here shown as being a three-phase alternator having Y-connected phase windings $97^a$, $97^b$ and $97^c$ and the rectifier 98 is shown as being a three-phase full-wave bridge rectifier having circuit arms $98^a$, $98^b$ and $98^c$ with which the respective phase windings are connected.

The power rectifier 98 has direct current positive and negative load terminals 101 and 102 with which the load conductor means 14 and 15 are connected. The direct current terminals 101 and 102 of the rectifier 98 are thus the load terminals of the generating unit 96 of this modified generating system 95.

The alternator 96 includes a field excitation winding $21^a$, which is connected across the output terminals 102 and 101 and is thus in the same circuit relation as the field winding of the generating system 10, and the energization of the field winding $21^a$ is controlled by the regulating means 32 in the same manner as has already been explained above for the generating system 10.

From the accompanying drawings and the foregoing detailed description it will now be readily understood that this invention provides an improved vehicle electrical system embodying novel regulator means by which a current limiting function is achieved in a more advantageous manner than has been done heretofore. It will now also be recognized that this invention provides novel regulator means by which such a current limiting function is obtainable in a vehicle electrical system of the kind having its positive potential side or load conductor means grounded. Additionally, it will now be seen that, by the present invention, these advantages are obtained in a vehicle electrical system by the use of novel regulating means of the static or transistor type.

Although the electrical generating system and regulating means provided by this invention have been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In combination with generator means having a field winding, and load circuit means connected with said generator means and comprising positive and negative load conductor means; field circuit means connected with said field winding; regulator means operable to vary the energization of said field winding in response to generator output load current variations in said load circuit means comprising switching means in said field circuit means, and control means for said switching means, said control means including first and second transistors each having emitter and collector main electrodes and a base as a control electrode; a series resistor in one of said load conductor means; and circuit means connecting the main electrodes of said transistors and the control electrodes of the transistors with said positive and negative load conductor means for normal operation of the transistors in a condition of deep saturation with the main electrodes of one of said transistors connected to control the conductivity of the other of said transistors, and also connecting the control electrode of said one of said transistors in a relation to said series resistor to be responsive to the occurrence of a predetermined voltage drop thereacross for causing the transistors to be driven out of saturation.

2. Apparatus as defined in claim 1 wherein one of said load conductor means is a common ground, and said series resistor is located in the other load conductor means.

3. Apparatus as defined in claim 1 wherein said series resistor is located in said negative load conductor means, and said one transistor is an NPN transistor.

4. In combination with generator means having a field winding, and load circuit means connected with said generator means and comprising positive and negative load conductor means; a battery connected with said load circuit means to be charged by said generator means; field circuit means containing said field winding; regulator means comprising transistor switching means having switching electrodes in said field circuit means and control electrode means, and control circuit means connected with said control electrode means and responsive to load current variations in said load circuit means comprising a plurality of other transistors each having emitter and collector main electrodes and a base as a control electrode and including an output transistor having its main electrodes connected to apply a signal to said control electrode means and an input transistor, said control circuit means further comprising a series resistor in one of said load conductor means, a first circuit means connected across said positive and negative load conductor means and connecting the control electrode of said output transistor to the main electrodes of said input transistor for normal operation of said output transistor in a condition of deep saturation, and other circuit means connecting the control electrode of said input transistor across said load conductor means and in a relation to said series resistor, the circuit constants of said other circuit means effecting operation of said input transistor in a saturated range for currents in said series resistor below a predetermined magnitude at the normal output voltage of said generator means and out of said range for higher currents and said output transistor operating in deep saturation when said input transistor is operating in its saturated range.

5. Apparatus as defined in claim 4 wherein said positive load conductor means is a common ground and said series resistor is located in said negative load conductor means; and wherein said second transistor is an NPN transistor.

6. In vehicle electrical apparatus; generator means comprising an alternator-rectifier unit having positive and negative direct current load terminals and a field excitation winding for the alternator; an external load comprising a battery to be charged; load circuit means connecting said battery with said load terminals including a common positive ground connected with the positive load terminal and a negative load conductor connected with the negative load terminal; field circuit means connecting said field winding with said load terminals; regulator means comprising transistor switching means having switching electrodes in said field circuit means and control electrode means, and means connected with said control electrode means and responsive to load current variations in said load circuit means comprising a plurality of other transistors each having emitter and collector main electrodes and a base as a control electrode; a series resistor in one of said load conductor means; a first control circuit means connected to said control electrode means and across said positive and negative load conductor means and containing the main electrodes of a first one of said other transistors; a second control circuit means connecting a second of said other transistors with the control electrode of said one transistor to control the conduction thereof and also connecting the main electrodes of said second transistor across said positive and negative load conductor means; and other circuit means connecting the control electrode of said second transistor in a relation to said series resistor to be responsive to the voltage drop thereacross whereby the voltage drop across said series resistor tends to render said transistor less conductive, the circuit constants of said second control circuit means and said other circuit means effecting operation of said first and said second ones of said transistors in a saturated range with said second transistor operating in a saturated range for currents in said series resistor below a predetermined magnitude for a given output voltage of said generator means.

7. In combination with generator means having a field winding, and load circuit means connected with said generator means and comprising positive and negative load conductor means; a battery connected with said load circuit means to be charged by said generator means; field circuit means containing said field winding; regulator means comprising transistor switching means having switching electrodes in said field circuit means and also having control electrode means; voltage responsive signaling means connected with said control electrode means and including voltage sensing means connected across said load terminals; a series resistor in one of said load conductor means; current limiter means comprising a pair of other transistors each having main electrodes and a control electrode; a first one of said other transistors having its main electrodes connected across said load terminals and being also connected with said control electrode means through said voltage signaling means; said first transistor being normally operable in deep saturation but subject to being driven out of saturation for causing a current limiting signal to be supplied to said control electrode means, the main electrodes of the second of said other transistors being connected with the control electrode of said first transistor, and circuit means connecting the control electrode and one of the main electrodes of said second transistor across said series resistor and across said load conductor means to bias said second transistor to deep saturation for no load current in said resistor and whereby a predetermined voltage drop across the latter drives said second transistor out of saturation to, in turn, drive said first transistor out of saturation.

8. Apparatus as defined in claim 7 wherein said series resistor is located in said negative load conductor means, and said second transistor is an NPN transistor.

9. In an electrical system having a pair of load conductors, a load current resistor in one of said load conductors, a transistor having an output circuit and control electrode means for controlling the current in said output circuit, circuit means applying a biasing voltage to said control electrode means and connecting said control electrode means to said resistor to bias said transistor to operate in a saturated condition for no load current flowing in said resistor and to effect operation of the transistor in a saturated range for currents in said load resistor below a predetermined magnitude, and control means connected to the output circuit of said transistor for reducing the current in said load circuit in response to an output current in said load circuit below the saturated output current of said transistor.

10. A current regulator as defined in claim 9 wherein said control means includes a second transistor whose conductivity controls the voltage applied to said load conductors, said second transistor having control electrode means for determining the conductivity thereof, and means connecting said output circuit and said control electrode means of said second transistor to vary the conductivity thereof in accordance with variations in the output current of the first-mentioned transistor.

11. A current regulator as defined in claim 9 wherein said circuit means comprises a second transistor having output electrodes and control electrode means with said output electrodes being connected to control the input current in the first said transistor and means for biasing said control electrode means of said second transistor and connecting the latter control electrode means to said resistor to bias the second transistor to operate in a saturated range for load currents below a certain magnitude and out of saturation for currents above said certain magnitude.

12. In combination with generator means having a field winding and load circuit means connected with said generator means and comprising a pair of load conductors; field circuit means connected with said field winding; and regulator means operable to vary the energization of said field winding in accordance with generator output comprising control means in said field circuit means operable to vary the energization of said winding, a transistor having an input circuit and an output circuit, a constant voltage device which breaks down at a predetermined voltage and becomes effective after breakdown to maintain a constant voltage thereacross for voltages above an extinguishing potential, voltage sensing means connecting said input circuit and said device in series across said load conductors and providing an input current in said circuit upon the breakdown of said device, a second transistor having control electrode means and output electrodes with the output electrodes being connected between a point in said series circuit and one of said conductors to increase the voltage drop across said device as the second transistor becomes less conductive, control circuit means connected to the control electrode means of said second transistor and biasing said second transistor to saturation for normal generator output voltage and load current, said control circuit means including a series resistor in one of said load conductors, the voltage across said resistor due to load current therein tending to render said second transistor nonconductive and the circuit constants of said control circuit means being such that said second transistor operates, when the voltage from said generator is at its normal value, in a saturated range for load currents below a predetermined magnitude and out of said saturation range for currents below said predetermined magnitude.

13. A regulator as defined in claim 11 wherein said output circuit connects the control electrode means of said second transistor to one of said conductors whereby the decrease in conduction of said first-mentioned transistor increases the voltage drop between said one conductor and said control electrode means.

14. In combination with generator means having a field winding and load circuit means connected with said generator means and comprising a pair of load conductors; field circuit means connected with said field winding; and regulator means operable to vary the energization of said field winding in accordance with the generator output comprising control means in said field circuit means operable to vary the energization of said winding, a transistor having an input circuit and an output circuit, a constant voltage device which breaks down at a predetermined voltage and becomes effective after breakdown to maintain a constant voltage thereacross for voltages above an extinguishing potential, voltage sensing means connecting said input circuit and said device in series across said load conductors and providing an input current in said input circuit upon the breakdown of said device, a second transistor having control electrode means and output electrodes with the output electrodes being connected between a point in said series circuit and one of said conductors to change the voltage drop across said device as the conductivity of said second transistor is changed, and control circuit means connected to the control electrode means of said second transistor and responsive to the current in said load conductors for changing the conductivity of said second transistor to thereby effect a breakdown of said device when the load current reaches a predetermined magnitude.

15. In a control system having electrical control means whose energization is to be varied in response to an electrical signal after said signal reaches a predetermined magnitude, a transistor having input electrodes and output electrodes connected to control the energization of said electrical means, circuit means for applying said input signal to said input electrodes to drive said transistor toward cutoff with an increase in said signal and biasing said transistor to a condition of deep saturation, the circuit constants of said circuit means causing said transistor to operate out of its saturated range when said signal is above said predetermined magnitude.

References Cited in the file of this patent

UNITED STATES PATENTS

| | | |
|---|---|---|
| 2,809,301 | Short | Oct. 8, 1957 |
| 2,912,635 | Moore | Nov. 10, 1959 |